United States Patent
Goldsworthy et al.

(10) Patent No.: US 9,696,048 B2
(45) Date of Patent: Jul. 4, 2017

(54) COMPACT DESICCANT COOLING SYSTEM

(71) Applicant: Commonwealth Scientific and Industrial Research Organisation

(72) Inventors: Mark Jared Goldsworthy, Mayfield (AU); Stephen David White, Mayfield (AU)

(73) Assignee: COMMONWEALTH SCIENTIFIC AND INDUSTRIAL RESEARCH ORGANISATION (AU)

( * ) Notice: Subject to any disclaimer, the term of this patent is extended or adjusted under 35 U.S.C. 154(b) by 90 days.

(21) Appl. No.: 14/649,475

(22) PCT Filed: Dec. 5, 2013

(86) PCT No.: PCT/AU2013/001413
§ 371 (c)(1),
(2) Date: Jun. 3, 2015

(87) PCT Pub. No.: WO2014/085860
PCT Pub. Date: Jun. 12, 2014

(65) Prior Publication Data
US 2016/0018116 A1   Jan. 21, 2016

(30) Foreign Application Priority Data
Dec. 5, 2012   (AU) ................... 2012905293

(51) Int. Cl.
*F24F 3/14*   (2006.01)
*F24F 5/00*   (2006.01)
(Continued)

(52) U.S. Cl.
CPC .......... *F24F 3/1423* (2013.01); *B01D 53/261* (2013.01); *F24F 5/0014* (2013.01);
(Continued)

(58) Field of Classification Search
CPC ................... F24F 3/1423; F24F 5/0035; F24F 2003/1464; F24F 3/14; F24F 2003/1458;
(Continued)

(56) References Cited

U.S. PATENT DOCUMENTS

| 4,926,618 A | * | 5/1990 | Ratliff | ............... | B01D 53/06 95/10 |
| 5,176,005 A | * | 1/1993 | Kaplan | ............... | F24F 3/1423 62/271 |

(Continued)

FOREIGN PATENT DOCUMENTS

| CN | 2557218 Y | 6/2003 |
| CN | 101406790 A | 4/2009 |

(Continued)

*Primary Examiner* — Mohammad M Ali
(74) *Attorney, Agent, or Firm* — Francis Law Group

(57) ABSTRACT

A solid desiccant cooling system comprising a common intake delivering air (19) to a first pathway (21) for air to be conditioned, and a second pathway (31) for regeneration air and structure (24) retaining a mass of solid desiccant for cyclic movement between a first location (24a), in which the solid desiccant lies in the first pathway (21) for dehumidifying the air to be cooled by adsorption of moisture to the desiccant, and a second location (24b) in which the solid desiccant lies in the second pathway (31) for the regeneration air to take up moisture therein as water vapor. The second pathway has an air heater arrangement (35) upstream of the second location (24b) for heating the regeneration air and the first pathway (21) has an air cooler arrangement (25) independent of the air heater arrangement (35) downstream of the first location (24a). An air delivery device (40) is coupled to both of the first and second pathways (21, 31) and adapted or configured to deliver pressurized air along both the first and second pathways (21, 31). A control strategy is also provided to change the flow path of air from the common intake based on the need to satisfy alternative (Continued)

heating or cooling needs at different times of the day and season.

9 Claims, 8 Drawing Sheets

(51) Int. Cl.
  *B01D 53/26* (2006.01)
  *B01D 53/06* (2006.01)
(52) U.S. Cl.
  CPC ............ *F24F 5/0035* (2013.01); *B01D 53/06* (2013.01); *F24F 2003/1464* (2013.01)
(58) Field of Classification Search
  CPC ..... F24F 3/1429; B01D 53/261; B01D 53/06; B01D 53/08; B01D 53/14; B01D 53/96
  USPC .................................................. 62/271, 311
  See application file for complete search history.

(56) References Cited

U.S. PATENT DOCUMENTS

| | | | | |
|---|---|---|---|---|
| 5,485,686 A | * | 1/1996 | Sears, Jr. | ............... F26B 21/083 34/473 |
| 5,758,511 A | * | 6/1998 | Yoho | ...................... F24F 3/1411 62/271 |
| RE37,464 E | * | 12/2001 | Meckler | .................... F24F 3/06 62/271 |
| 7,017,356 B2 | * | 3/2006 | Moffitt | .................. F24F 3/1423 62/271 |
| 7,104,082 B1 | * | 9/2006 | Moratalla | ............. F24F 3/1423 165/8 |
| 7,654,101 B2 | * | 2/2010 | Shapiro | ................. F24F 3/1423 165/45 |
| 2003/0209017 A1 | * | 11/2003 | Maisotsenko | ......... F24F 3/1411 62/121 |
| 2006/0162366 A1 | * | 7/2006 | Moratalla | ............. B01D 53/26 62/271 |
| 2009/0145140 A1 | | 6/2009 | Shapiro | |
| 2010/0058778 A1 | | 3/2010 | Bhatti et al. | |
| 2010/0070092 A1 | * | 3/2010 | Winter | ...................... F24F 3/08 700/278 |
| 2010/0307175 A1 | * | 12/2010 | Teige | .................... F24F 3/1423 62/94 |
| 2011/0088417 A1 | * | 4/2011 | Kayser | ................. F24F 3/1423 62/94 |

FOREIGN PATENT DOCUMENTS

| | | |
|---|---|---|
| CN | 101672502 B | 6/2012 |
| JP | 2004008914 A | 1/2004 |
| JP | 2006248360 A | 9/2006 |

\* cited by examiner

COMPACT DESICCANT COOLING SYSTEM

FIELD OF THE INVENTION

This invention relates generally to solid desiccant cooling systems of the kind in which a mass of solid desiccant is cyclically moved between an active position in which it dehumidifies an airflow and a regeneration position in which hot air is employed to evaporate the moisture from the desiccant. The usual approach involves a rotary desiccant wheel, and the dehumidified air is usually further conditioned by evaporative cooling prior to its admission to a space to be cooled.

BACKGROUND OF THE INVENTION

Solid desiccant cooling systems of the aforementioned kind have been proposed in a variety of configurations. In the basic arrangement shown in FIG. 1, fresh (outside) air 1 supplied by a supply air fan is dehumidified in a rotary desiccant wheel 3. In this near adiabatic drying process, the air is unavoidably warmed. A heat recovery heat exchanger 4 is used to cool the warm dry air back down to near ambient temperature. The resulting pre-cooled, dry air stream is then further cooled to temperatures below ambient using an evaporative cooling process 6 before it is introduced into the occupied space (supply air 7) to provide the desired space conditioning.

Regeneration of the desiccant wheel is required to ensure a continuous drying process. Regeneration is achieved by passing hot air through one side of the desiccant wheel. Moisture removed from the desiccant wheel is exhausted with, the regeneration air stream exiting the desiccant wheel.

Regeneration air can be sourced from the occupied space (return air 8) or from outside ambient (fresh air). Regeneration air is first evaporatively cooled in coolers 9 before it is pre-heated in the heat recovery heat exchanger 4. This minimises the supply air temperature before the supply air evaporative cooling process and maximises the regeneration air temperature before it is further heated in a heating coil 10 with externally supplied heat. The heated return air is then passed through the regenerator side of the desiccant wheel 3 before being exhausted by regeneration air fan 11 as exhaust air 12.

Desiccant cooling is primarily found in commercial and larger-scale installations, especially where higher humidity is a significant issue, for example in supermarkets and ice-skating venues. The technology is not found in residential applications to any significant extent, notwithstanding a number of potential advantages: robustness, easy maintenance and efficient operation with low temperature heat such as that from roof-mounted solar collectors. Solar desiccant cooling systems have been evaluated in a number of publications (including S. D. White et al. "Indoor temperature variations resulting from solid desiccant cooling in a building without thermal back-up", International Journal of Refrigeration 32 (2009), 695-704; and Rowe et al. "Preliminary findings on the performance of a new residential solar desiccant air-conditioner", Proc. Eurosun 2010, Graz, October 2010).

The limited application of desiccant cooling systems has arisen from disadvantages of the basic arrangement described above. This process suffers from (i) high parasitic fan power consumption due to the large pressure drops across the desiccant wheel and heat recovery wheel, (ii) bulkiness (due to the presence of two fans to respectively drive air on the supply and regeneration sides), (iii) cost and (iv) unsuitability for autonomous cooling with an intermittent heat source (due to the inability to achieve significant cooling when heat is not available for regenerating the desiccant wheel).

Previously, it has been proposed to address these disadvantages, at least to an extent, by replacing the heat recovery heat exchanger, employed to cool the warm dry air on the supply side back down to near ambient temperature and to pre-heat the regeneration air, with an indirect evaporative cooler on the supply side.

It has been realised that the earlier mentioned previous proposal to replace the heat recovery heat exchanger with an indirect evaporative cooler on the supply side presented an opportunity to substantially eliminate the pressure imbalances between the supply and regeneration sides of the desiccant cooling circuit. Specifically, the supply air and regeneration air streams both flow through
  a single heat exchanger process and
  a single desiccant wheel pass of equal effective length, For the purposes of the present invention, the effective length along a pathway is the length of the ducting plus the equivalent length of a ducting, which produces the same pressure drop as a unit operation(s) (e.g. heat exchanger and/or desiccant wheel) along the pathway. For example, a pathway comprising ducting of length L and a desiccant wheel ($L_d$) has an effective length of $L+L_d$, where $L_d$ is the length of ducting which produces the same pressure drop as the desiccant wheel. Therefore, by definition pathways of similar effective length have pressure drops of a similar magnitude.

As a result, the flow velocities and pressure drops on the supply and regeneration air sides are each of a similar magnitude. This inherent balance of pressure drop between the supply air and regeneration air enables a single source of air to divide and flow equally (or substantially equal) between the supply and regeneration air ducts without need for pressure balancing/reducing dampers or other control devices.

Consequently, the conventional pair of fans used in the conventional desiccant cooling process can be replaced with a single fan supplying air to both the supply and the regeneration sides, without resorting to pressure reducing dampers for controlling flow between the supply and regeneration air sides. It has been further appreciated that one fan instead of two would reduce the bulk and cost of the system, and eliminating pressure reducing dampers would reduce parasitic fan power.

Shapiro (US 2009/0145140 A1, 2009) proposes a cycle with a single fan. However, this cycle is not inherently balanced. In the Shapiro cycle, the air to be dried passes through the desiccant wheel and a heat exchanger, while the regeneration air stream passes through the desiccant wheel and four heat exchangers. Consequently the Shapiro cycle needs pressure reducing dampers to balance the flows and pressures between the supply and regeneration sides, leading to unacceptably high fan energy consumption compared with the conventional two fan process.

Furthermore the Shapiro cycle does not provide means for transitioning between alternative modes of operation when utilizing a single fan.

It has also been recognised that environmental conditions and location have an effect on the qualities of the air to be conditioned and the reconditioned air. These qualities include humidity and temperature. Thus a solid desiccant cooling system which is designed for efficient use under one set of climactic or environmental conditions may not be efficient at all times of the year and may not be capable of use in a wide range of locations and circumstances. Thus the ability to transition to different modes of operation depending for seasonal or other circumstances may be advantageous for efficient operation.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

It is an object of the invention to provide one or more modifications of solid desiccant cooling processes of the kind earlier described that at least in part overcome the afore described disadvantages.

SUMMARY OF THE INVENTION

According to a first aspect, the invention provides a solid desiccant cooling system, comprising:
  means defining a first pathway for air to be cooled, and a second pathway for regeneration air;
  structure retaining a mass of solid desiccant for cyclic movement between a first location, in which the solid desiccant lies in the first pathway for dehumidifying the air to be cooled by adsorption of moisture to the desiccant, and a second location in which the solid desiccant lies in the second pathway for the regeneration air to take up moisture therein as water vapour;
  an air heater arrangement in the second pathway upstream of the second location for heating the regeneration air;
  an air cooler arrangement, independent of the air heater arrangement, in the first pathway downstream of the first location; and
  an air delivery device coupled to both of the first and second pathways whereby the device is operable to deliver air along both of the first and second pathways from a common intake, wherein the pressure drop along the respective pathways is of a similar magnitude and no pressure reduction dampers are provided for flow control between the two pathways.

Preferably, the first pathway extends from an air intake to a space to be conditioned and the second pathway extends to and through the regeneration side of the mass of solid desiccant material and preferably includes respective ducting.

In another aspect the invention further provide a solid desiccant cooling system, comprising:
  a common intake delivering air to a first pathway for air to be conditioned, and a second pathway for regeneration air;
  structure retaining a mass of solid desiccant for cyclic movement between a first location, in which the solid desiccant lies in the first pathway for dehumidifying the air to be cooled by adsorption of moisture to the desiccant, and a second location in which the solid desiccant lies in the second pathway for the regeneration air to take up moisture therein as water vapour;
  an air heater arrangement in the second pathway upstream of the second location for heating the regeneration air;
  an air cooler arrangement, independent of the air heater arrangement, in the first pathway downstream of the first location;
  an air delivery device coupled to both of the first and second pathways and adapted or configured to deliver a positive air pressure along both the first and second pathways; and
  a control arrangement or strategy to change the flow path of air from the common intake based on the need to satisfy alternative heating or cooling needs at different times of the day and/or season.

The air delivery device is positioned upstream of the mass of solid desiccant and heating arrangements and provides a positive air pressure to drive the air through the respective pathways. Hence the driving force for air to pass along the respective pathways is pressurised air before the mass of solid desiccant rather than a draft fan drawing air from the downstream side of these apparatus. Such an arrangement provides flexibility to supply heating and cooling to an associated space.

The control arrangement or strategy may be a switch control system comprising
  one or more diverter arrangements configured to selectively bypass the mass of solid desiccant in the first pathway and/or divert the regeneration air from the second pathway; and
  switches arranged or programmed to operate the diverter arrangement(s) to selectively operate the solid desiccant cooling system in one of a plurality modes with respect to an associated space, the modes being selected from the group consisting of desiccant cooling, non-desiccant cooling and heating.

The switches act in an on/off capacity to either, include or exclude the mass of solid desiccant in the first pathway and/or the second pathway. The switches act upon diverters which are either open or closed to include or exclude the mass of solid desiccant. The control system may be operated manually, based on responses from temperature and humidity sensors or pre-programmed based on the time of the calendar year. The dampers operate only in discrete flow operation and do not provide a continuous range of flow or pressure reduction across the diverter.

Preferably the first and second pathways include ducting from the air intake to a space to be conditioned and ducting incorporating the bypass arrangements. The second pathway may include ducting from the air intake to, and preferably beyond, the mass of solid desiccant and associated above diversion of fresh air.

In the above aspects the ratio of airflow through the first pathway to the second pathway is in the range 0.3:1 to 6:1;

The invention according to another aspect provides a method of operating a solid desiccant cooling cycle, comprising
  delivering a flow of air to be conditioned and regeneration air from a common intake,
  cyclically moving a mass of solid desiccant between a first location, in which the solid desiccant lies in the flow of air to be conditioned and dehumidifies that air by adsorption of moisture to the desiccant, and a second location in which moisture is taken up from the desiccant by heated regeneration air,
  wherein the pressure drop along the respective flows is maintained at a similar magnitude without use of pressure reduction dampers in the first and second pathways.

In a further aspect the invention provides a method of operating a solid desiccant cooling cycle, comprising
  delivering a flow of air to be conditioned and regeneration air from a common intake
  cyclically moving a mass of solid desiccant between a first location, in which the solid desiccant lies in the flow of air and dehumidifies that air by adsorption of moisture to the desiccant, and a second location in which moisture is taken up from the desiccant by heated regeneration air, and controlling the first and second pathways to satisfy alternative heating or cooling needs at different times of the day and season.

The first and second pathways may be controlled by including or excluding the mass of solid desiccant. This control strategy may be accomplished by switching in or out the heat and mass transfer processes applied over the first and second pathways.

The flow of air to the first and second pathways may be controlled by switching the mass of solid desiccant in the first and second pathway in or out of the first and second pathways respectively.

In the above aspects, the air cooler arrangement may include an indirect evaporative cooler. A second, direct evaporative cooler stage and/or refrigerative cooling stage, downstream of the indirect evaporative cooler, can also be optionally included.

In the above aspects, the air heater arrangement may include a device adapted to heat the regeneration air by "low grade" heat, e.g. one or more of a solar collector system, a solar hot water system, a heat pump, and an engine jacket coolant, either directly, or indirectly via an intermediate heat transfer fluid.

The air delivery device is advantageously, an air circulation fan.

The structure retaining a mass of solid desiccant is preferably a desiccant wheel.

The solid desiccant cooling system may include flow diverter arrangements configured to be able to selectively bypass the mass of solid desiccant in the first pathway and/or divert the heated regeneration air from the second pathway. The system may further provide switch arrangements arranged or programmed for selecting among these options. The switch arrangements act in an on/off capacity to either include or exclude the mass of solid desiccant in the first pathway and/or include or exclude any heating arrangements in the second pathway. The system is thereby adaptable to be operated selectively in a plurality of modes with respect to an associated space, for example desiccant cooling, non-desiccant cooling and heating.

Preferably, the regeneration air does not include any air from the space to which the dehumidified air is directed. This minimises duct work, facilitates building internal pressurisation, and alleviates possible problems with positioning of the desiccant cooling process or system.

The invention also provides a switching control system for the above described solid desiccant cooling system, comprising
  one or more diverter arrangements configured to selectively bypass the mass of solid desiccant in the first pathway and/or divert the regeneration air from the second pathway; and
  switches arranged or programmed to operate the diverter arrangement(s) to selectively operate the solid desiccant cooling system in one of a plurality of modes with respect to an associated space, the modes being selected from the group of desiccant cooling, non-desiccant cooling and heating.

The switches act in an on/off capacity to either include or exclude the mass of solid desiccant in the first pathway and/or include or exclude the mass of solid desiccant, in the second pathway.

The switching control system preferably carries out the method of the invention in one operating mode selected from the group of space heating, indirect evaporative cooling, or desiccant cooling modes. Preferably the switching system comprises at least three diverters.

In any one of the plurality of modes of operation in the above aspects of the invention, the ratio of airflow through the first pathway to the second pathway is in the range 0.3:1 to 6:1.

As used herein, except where the context requires otherwise, the term "comprise" and variations of the term, such as "comprising", "comprises" and "comprised", are not intended to exclude further additives, components, integers or steps.

BRIEF DESCRIPTION OF THE DRAWINGS

The invention will now be further described by way of example only by reference to the accompanying drawings, in which.

DETAILED DESCRIPTION OF THE EMBODIMENTS

Figure 2:
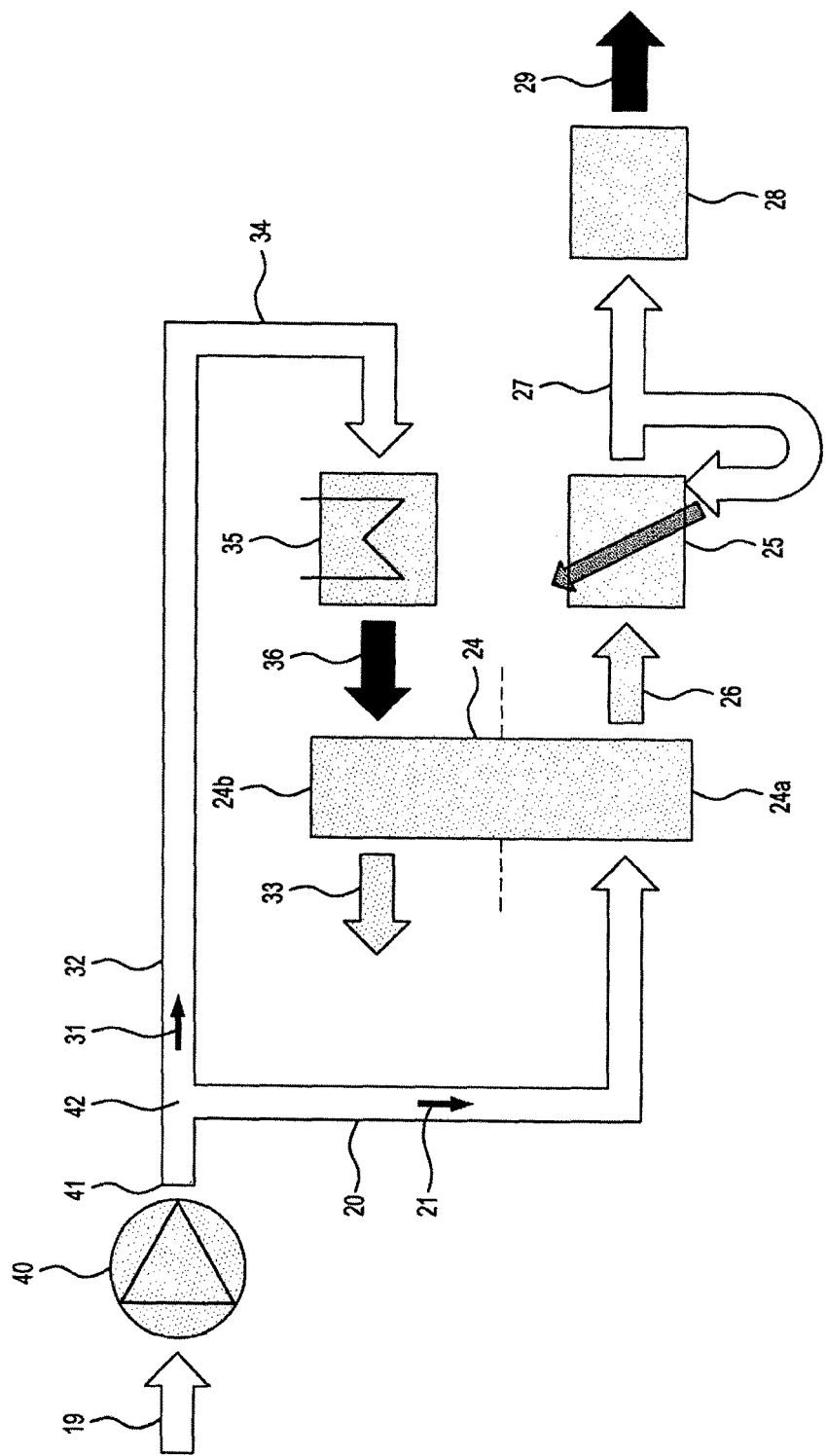
FIG. 2 is a diagram of an air-conditioning configuration incorporating a solid desiccant cooling system according to an embodiment of the invention.

In the air conditioning configuration illustrated in FIG. 2, fresh (outside) air 20 in a first pathway 21 defined by ducting 22 is dehumidified in one side 24a of a cyclic desiccant structure 24 such as a rotary desiccant wheel. In this near adiabatic drying process, the air is unavoidably warmed. An indirect evaporative cooler 25 is used to cool the warm dry air 26 in pathway 21 back down to near ambient temperature. The resulting pre-cooled, dry air stream 27 is then further cooled to temperatures below ambient using an evaporative cooler 28 before it is introduced into the occupied space 29 to provide the desired space conditioning.

Regeneration of the desiccant wheel 24 is achieved by passing hot air 36 in a second pathway 31 defined by ducting 32 through the other side 24b of the desiccant wheel 24. Water vapour evaporated from the desiccant wheel is exhausted with the regeneration air stream 33 exiting the desiccant wheel in pathway 31.

Regeneration air 24 is heated in a heating coil 35 with externally applied heat to obtain hot air 36 for regeneration of the desiccant wheel 24.

Desiccant wheel 24 retains a mass of solid desiccant for cyclic movement, by rotation of the wheel, between first location 24a, in which the solid desiccant lies in pathway 21 for dehumidifying the air 20 to be cooled by adsorption, and second location 24b in which the solid desiccant lies in pathway 31 for the regeneration air 34 to take up moisture therein as water vapour.

A single air circulation fan 40 pressurizes fresh ambient air 20 for the process and delivers it along both pathways 21, 31 from a common intake 41 at the fan. Thus, at a flow divider 42, one fraction 34 of the pressurised air is diverted, along pathway 31 defined by ducting 32, to heating coil 35 where it is heated and then used, as heated airflow 36, to regenerate the desiccant wheel.

The remaining fraction 20 of the pressurised air exiting fan 40 is delivered along pathway 21 defined by ducting 22 to the dehumidifying side 24a of the desiccant wheel where, as already described, it is first dehumidified and then cooled in turn by indirect evaporative cooler 25 and direct evaporative cooler 28.

The pressure of the air required from the fan is reduced, compared with the conventional process, through the elimination of the conventional heat recovery heat exchanger. Furthermore, the pressure drop over the regeneration air side is well matched with the pressure drop over the supply air side, i.e. the pressure drops are of similar magnitude and hence a single fan can provide air at a single pressure level suitable for both sides of the desiccant process. These factors lead to reduced parasitic fan power consumption.

By "similar magnitude" in relation to the pressure drops is meant that the difference between the pressure drops is preferably less than 60 Pa, more preferably less than 30 Pa and most preferably less than 10 Pa. The differences in the pressure drop are typically related to differences in the length, diameter and/or configuration of the respective pathways. In preferred embodiments, in which the solid desiccant cooling system is used for residential applications, the pathway lengths are small (e.g. <1 m) and, as such, the pressure drops across these respective pathways are expected to similar, if not the same. To balance the pressure drop, preferably there needs to be similar pressure drops over the respective sub units through which the air must flow through on each side.

Figure 1:
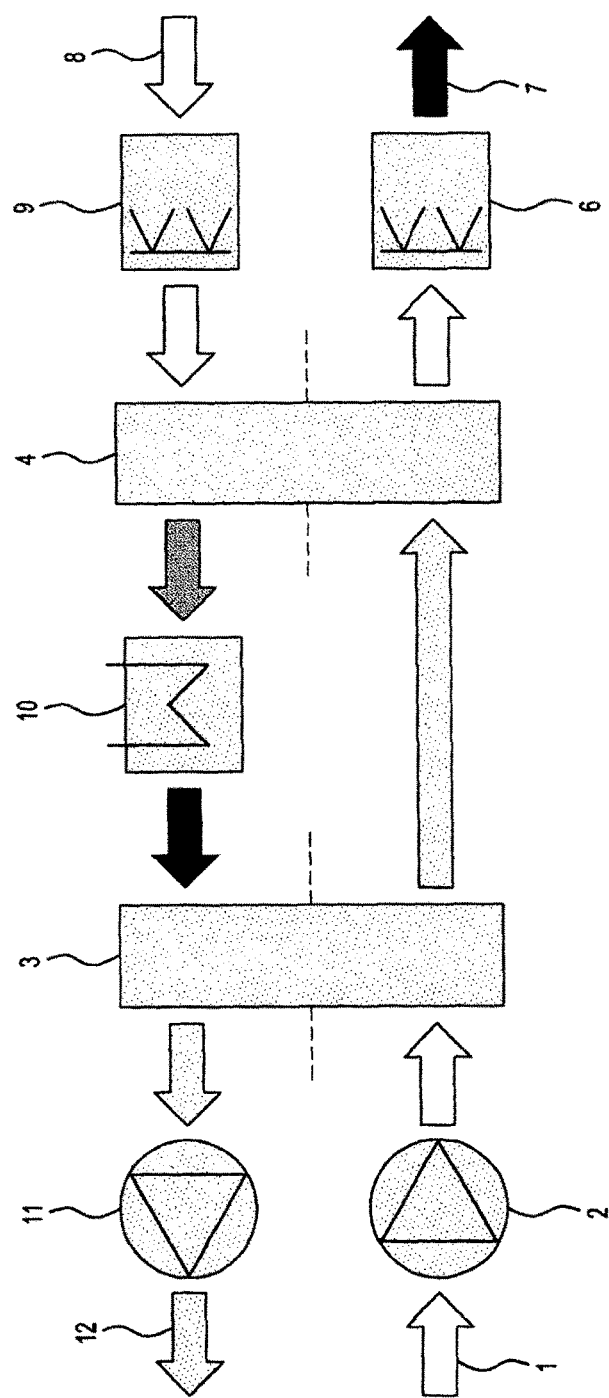
FIG. 1 is a diagram of a conventional air-conditioning configuration incorporating a solid desiccant cooling system.
Figure 3:
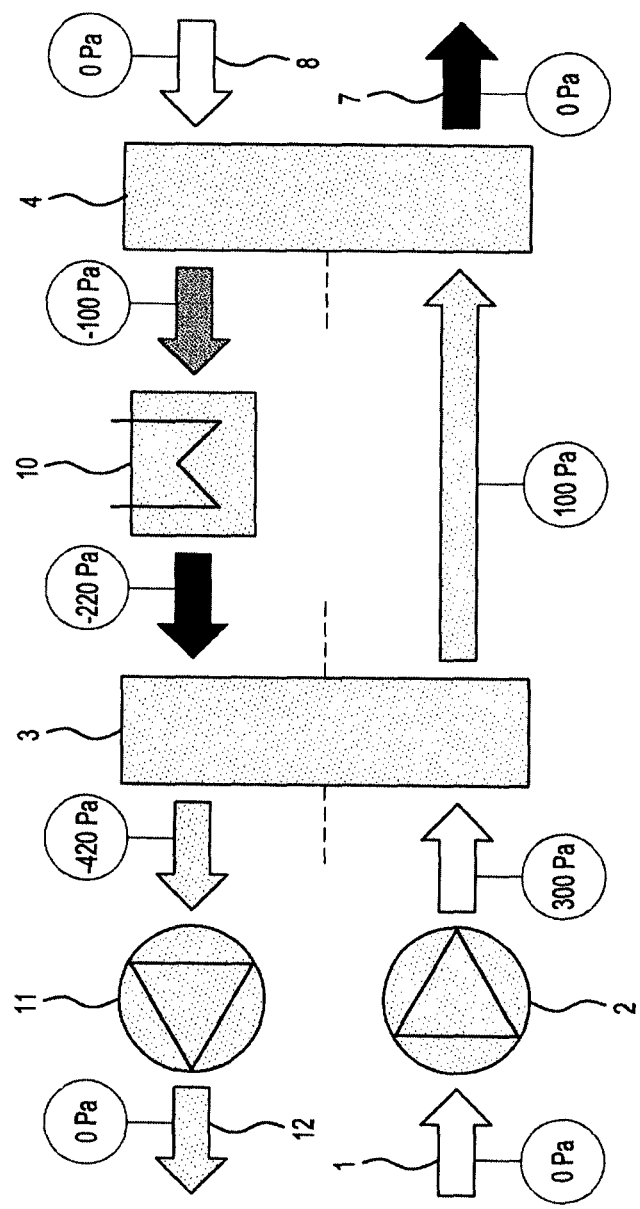
FIG. 3 is a flowchart of typical pressures at each point of each of the return and supply air pathways of the system of FIG. 1.
Figure 4:
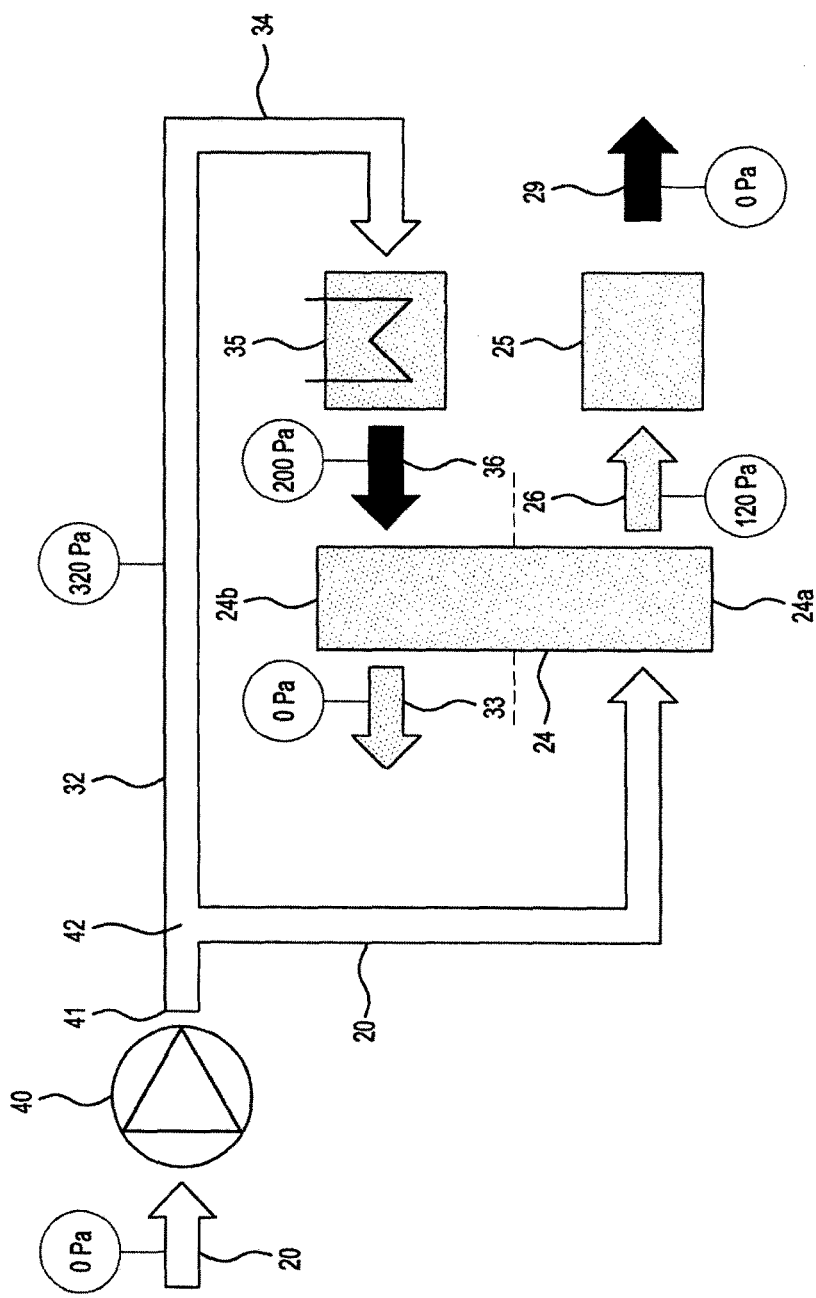
FIG. 4 is a flowchart illustrating typical respective pressures at each point of each of the exhaust and supply air pathways of the system of FIG. 2.

By way of exemplification, in the conventional process shown in FIGS. 1 and 3 employing a heat recovery heat exchanger, the pressure required at the supply (cooling) side is of the order of 300 Pa, but the regeneration air must attain 420 Pa or so. In the arrangement of FIGS. 2 and 4, the cycle requires 320 Pa on both sides and hence the inventors have realised that this is well balanced and suitable for use of a single fan to provide air to both sides of the system.

Air pressure and associated parasitic fan power can be further reduced, for a substantial portion of a given year's operation, by operating in alternative modes. This approach requires a new control system which preferably comprises a controller and switching diverter devices.

Figure 5:
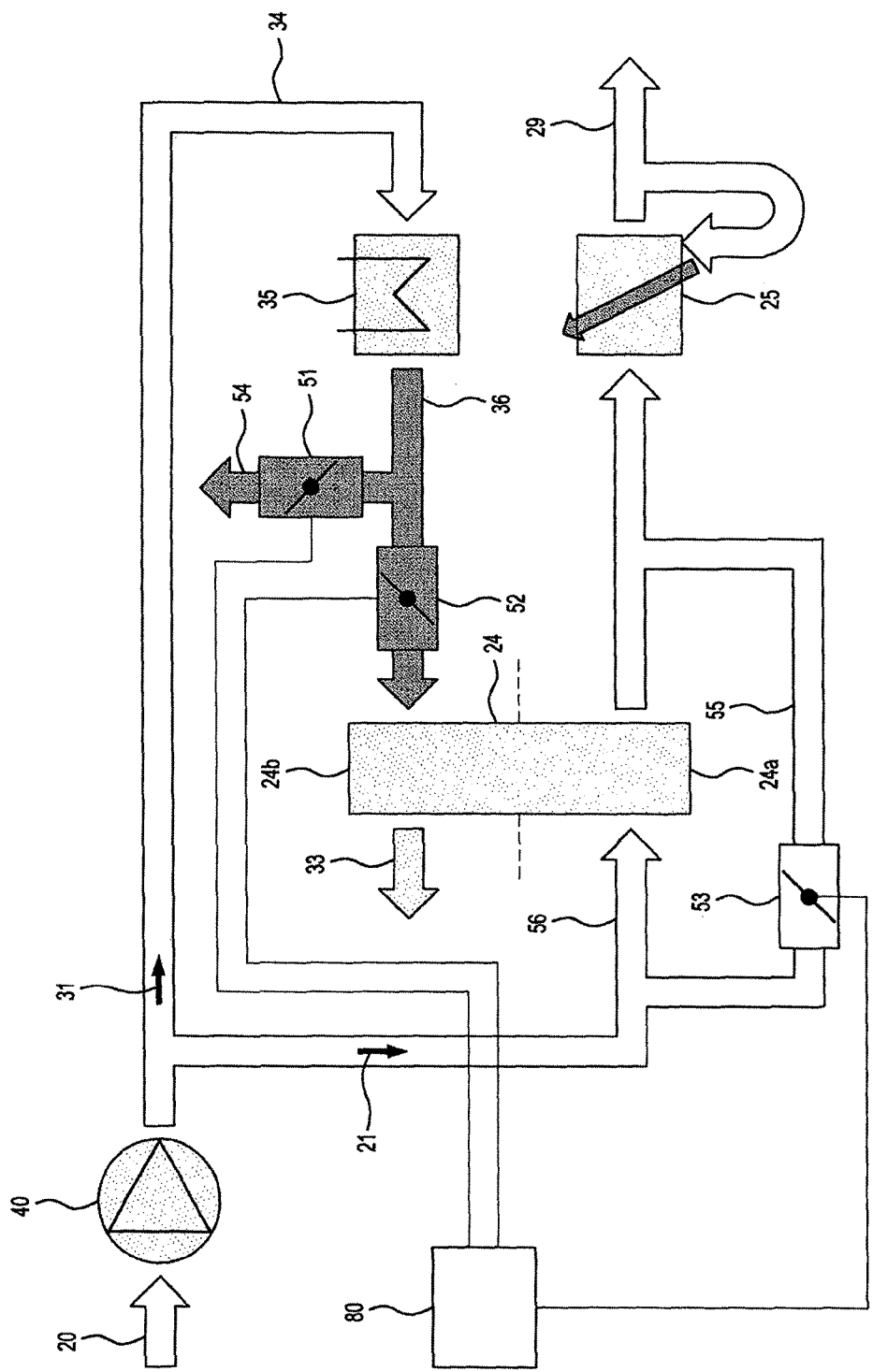
FIG. 5 is the system of FIG. 2 showing on/off diverters positioned according to a second embodiment of the invention.

In the embodiment of FIG. 5, a flow diverter arrangement is shown allowing different modes of operation. The flow diverter arrangement includes diverters 51, 52, 53 operated by switches. These switches operate to turn the diverters on or off (opened or closed) so that only discrete flow options are available and partial flow through the diverters along both and/or either flow paths is not available.

Figure 7:
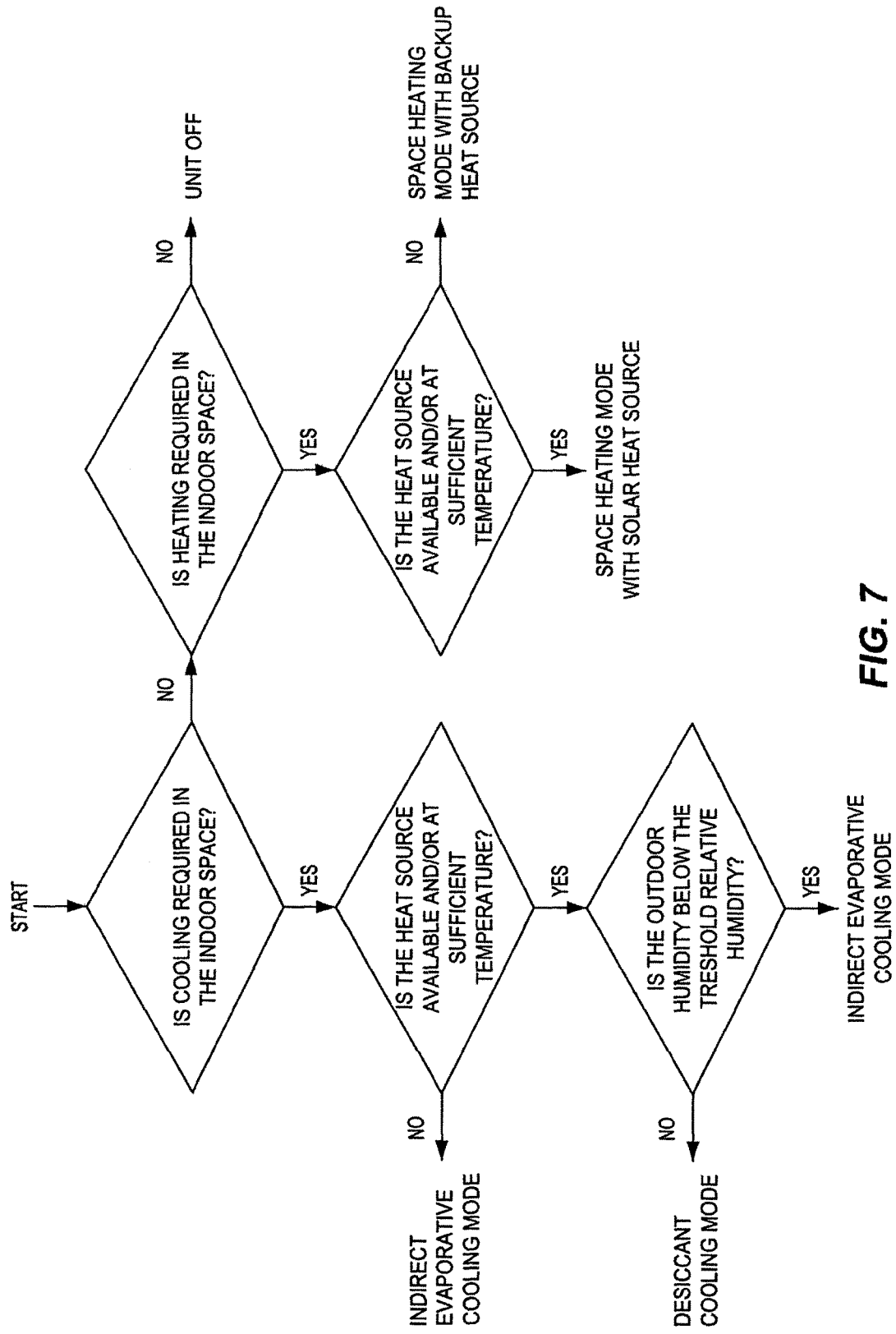
FIG. 7 is a flowchart of logical steps for selection of an optimal operational mode for the configuration of FIG. 2.

The diverters and associated switches are preferably operated or controlled by a control device which is arranged or programmed to enable the different modes of operation. The three possible modes of operation and the diverter positions for each are shown in table 1 and the switching logic is shown in FIG. 7.

Three open/close diverter arrangements are shown.

Diverter 51 controls diversion of heated air downstream of heater 35. Maintaining diverter 53 closed, closing diverter 52 and opening diverter 51 allows passage of heated air as space heating to an occupied space through pathway 54. Due to the much larger pressure drop across the desiccant, the majority of the air will preferentially flow through the second pathway 31.

Normal desiccant cooling mode occurs when diverter 52 is open and diverters 51 and 53 are closed.

Indirect evaporative cooling occurs when diverter 53 is open and diverters 51 and 52 are closed. Due to the pressure drop across the desiccant, air will preferentially pass through pathway 55 to evaporative cooler 28 than through pathway 56.

Closing and opening of diverters 51, 52, 53 is managed by a controller 80, which is configured or programmed to allow selection of various diverter position combinations to set desired operating modes including desiccant cooling, non-desiccant cooling (in this case indirect evaporative cooling) and space heating. The selection may be by manual override but is normally in response to various environmental data inputs.

In all modes of operation the ratio of airflow through the first pathway to the second pathway is within the range 0.3:1 to 6:1.

Table 1 sets out diverter positions for the three modes.

TABLE 1

| Mode | Diverter 1 position | Diverter 2 position | Diverter 3 position |
| --- | --- | --- | --- |
| Desiccant cooling | closed | open | closed |
| Indirect evaporative cooling | closed | closed | open |
| Space heating | open | closed | closed |

The logic that determines the choice of optimum operation mode from data inputs is illustrated as a flowchart in FIG. 7.

The outdoor ambient relative humidity signal can be directly measured and supplied to the controller. A threshold outdoor relative humidity, below which there is limited advantage in using desiccant cooling (compared with indirect evaporative cooling), is around 50%.

It is also possible to use a number of alternative measured signals which indirectly infer the outdoor relative humidity and hence provide an approximate substitute. For example a time clock can be used to infer typical approximate diurnal variations in outdoor relative humidity. The temperature at the outlet of the desiccant wheel could also provide an approximate alternative to a direct outdoor relative humidity signal.

Figure 8:
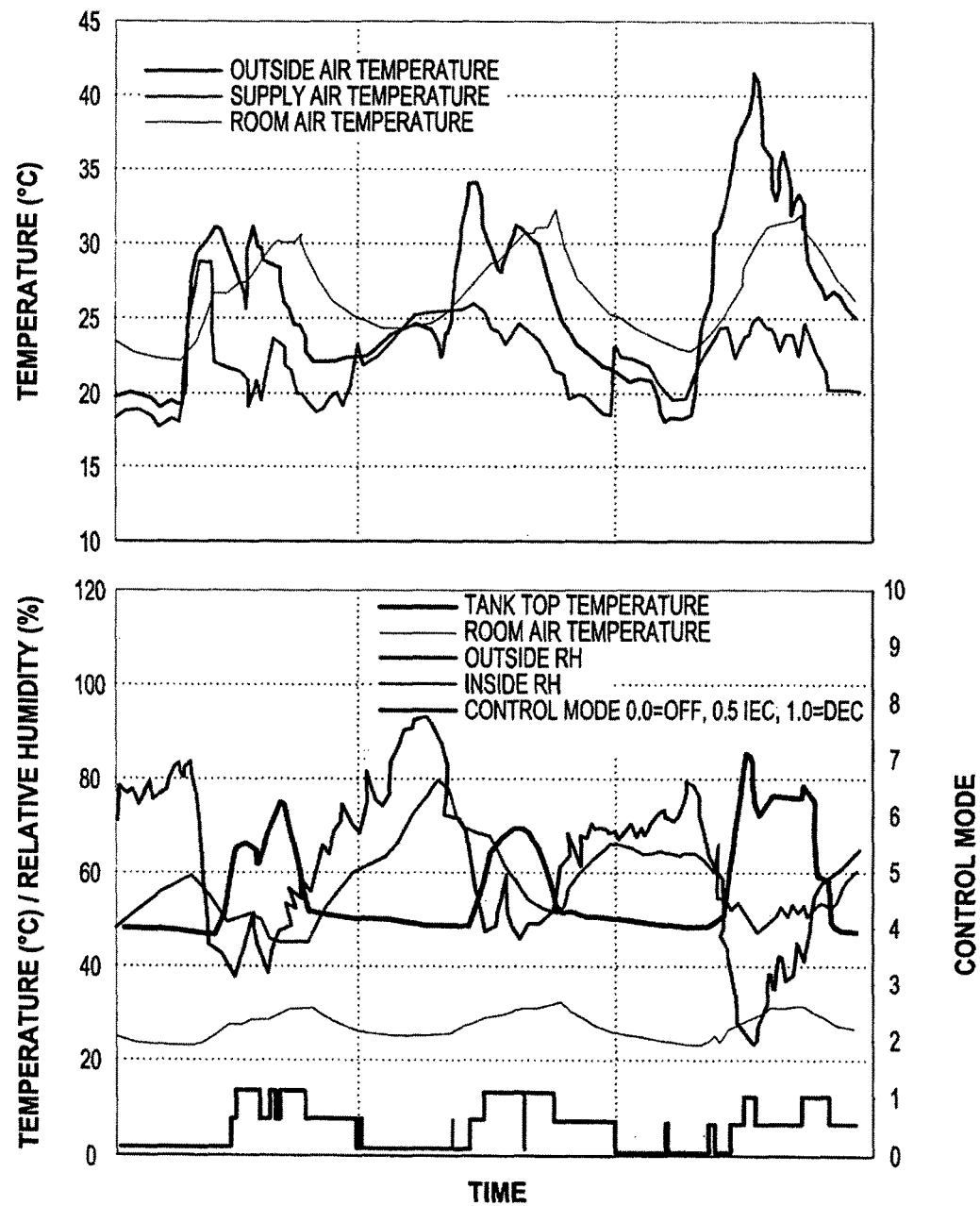
FIG. 8 is a 3-day log of relevant control inputs and the resulting control signal for the system of FIG. 2.

An examplary operating profile of the desiccant cooler of FIG. 5, with the desiccant wheel regenerated by a solar thermal heat source, is illustrated in FIG. 8. The period covers three days in summer.

In days 1 and 2, the desiccant cooling system is operating predominantly in desiccant cooling mode during daylight hours as (i) the hot water heat supply from the solar hot water system is at sufficient temperature and (ii) the outside relative humidity is above 50%. In the evening, stored heat in the hot water tank is depleted and the system goes into indirect evaporative cooling mode.

On the third day, the outside temperature is high, but the relative humidity is low. As a result, the system operates predominantly in indirect evaporative cooling mode, even though the hot water temperature is hot enough for desiccant cooling.

Year-long hour by hour TRNSYS simulations suggest that a solar desiccant cooling system, based on this design, would operate in indirect evaporative cooling mode more than 50% of the total operating hours where cooling is required.

Figure 6:
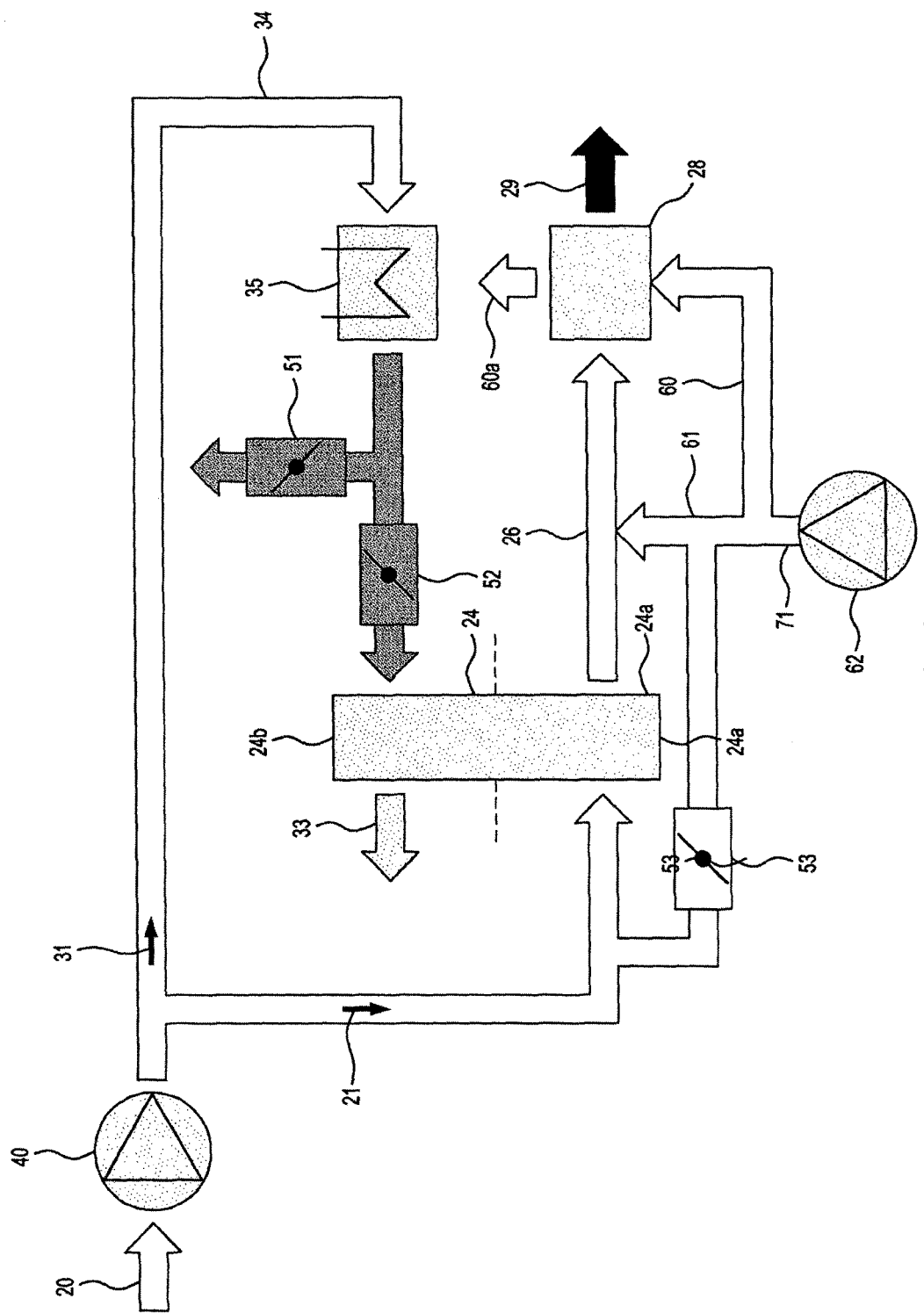
FIG. 6 is the system of FIG. 2 showing on/off diverters positioned according to the first embodiment of the invention.

In the modification of the configuration illustrated in FIG. 6, an additional controlled portion of recirculation air 61 from the building into which the conditioned air is being directed, may be introduced into the air, stream 26 that is passed through the indirect evaporative cooler 28. A further air stream from a return air fan 62 may be provided to provide pressurised building return air to a suitable introduction point for this building recirculation air at 71 in FIG. 6. The booster fan may also provide return air directly into evaporative cooler 28 for heat exchange with air stream 26 from dehumidified side 24a of desiccant mass 24.

More generally, the invention envisages that there may well be additional cooling devices and/or circuits in the building or in the air circulation streams.

It is believed that the inventive configuration, at least in one or more embodiments, is adaptable as a low-cost compact cooling system suitable for residential applications.

Notable advantages include:—
- A low capital cost, more compact system due to the reduced number of equipment parts.
- Low air pressure drop and hence low parasitic fan power consumption.
- Ability to provide at least partial cooling in indirect evaporative cooling mode even when heat is not available. This makes it a more suitable year round cooling device, particularly for intermittent solar applications.

The invention claimed is:

1. A desiccant cooling system, comprising:
   first air transport means defining a first pathway for first air;
   second air transport means defining a second pathway for second air;
   an air delivery device coupled to said first and second air pathways, said air delivery device being configured to deliver ambient input air from a common air intake to said first and second air pathways, wherein a first pressure drop is exhibited in said first air pathway and a second pressure drop is exhibited in said second pathway, said first pressure drop and said second pressure drop having the same magnitude, and wherein no pressure reduction dampers are provided for air flow control between said first and second air pathways;
   a desiccant structure configured to retain solid desiccant therein, said desiccant structure being further configured to provide cyclic movement between a first desiccant structure location, wherein said first air pathway is in communication with said solid desiccant, wherein said first air is dehumidfied by adsorption of moisture by said desiccant and forms dehumidified air, and a second desiccant structure location, wherein said second air pathway is in communication with said solid desiccant, and wherein said second air absorbs moisture in said solid desiccant and forms regeneration air;
   an air heater in communication with said second air pathway, said air heater being configured to heat said regeneration air;
   an air cooler in communication with said first air pathway, said air cooler being configured to cool said dehumidified air.

2. The cooling system of claim 1, wherein said air delivery device comprises a flow divider that is configured to deliver a first fraction of said ambient input air to said first air pathway and a second fraction of said ambient input air to said second air pathway.

3. The cooling system of claim 1, wherein said cooling system further comprises at least a first diverter configured to provide at least a first air diversion mode selected from the group consisting of first air diversion of said first air in said first air pathway, wherein said first air bypasses said solid desiccant in the first pathway, and a second air diversion mode comprising diversion of said second air in said second air pathway away from said solid desiccant, and a controller in communication with said first diverter that is programmed and configured to control said air diversion mode.

4. The cooling system of claim 1, wherein airflow of said first air through said first air pathway and airflow of said second air through said second air pathway exhibit a first airflow to second airflow ratio in the range 0.3:1 to 6:1.

5. The cooling system of claim 1, wherein said air cooler comprises an indirect evaporative cooler.

6. The cooling system of claim 5, wherein said air cooler further comprises a second evaporative cooler stage comprising a direct evaporative cooler stage and a refrigerative cooling stage.

7. The cooling system of claim 1, wherein said air cooler further comprises a refrigerative cooling stage.

8. The cooling system of claim 1, said air heater is configured to provide heat energy from a heat source selected from the group consisting of a solar collector system, a solar hot water system, a heat pump, and an engine jacket coolant.

9. A method of operating a solid desiccant cooling cycle, comprising the steps of:
   delivering first and second air pathways to a desiccant structure, said first air pathway comprising a first pressure drop and said second air pathway comprising a second pressure drop, said first pressure drop and said second pressure drop having the same magnitude,
   said desiccant structure being configured to retain solid desiccant therein, said desiccant structure being further configured to provide cyclic movement between a first desiccant structure location, wherein said first air pathway is in communication with said solid desiccant, and a second desiccant structure location, wherein said second air pathway is in communication with said solid desiccant, and a second desiccant structure location, wherein said second air pathway is in communication with said solid desiccant; and
   cyclically moving said desiccant structure between said first desiccant structure location, wherein first air in said first air pathway is dehumidified by adsorption of moisture by said desiccant, and said second desiccant structure location, wherein second air in said second air pathway absorbs moisture in said solid desiccant and forms regeneration air.

* * * * *